United States Patent

[11] 3,572,811

[72] Inventor John E. Kasten
 136 Concord Lane, West BND, Wis. 53095
[21] Appl. No. 847,909
[22] Filed Aug. 6, 1969
[45] Patented Mar. 3, 1971

[54] FARM WAGON WITH HINGED ROOF
 10 Claims, 4 Drawing Figs.
[52] U.S. Cl. ............................................... 296/26,
 296/137, 52/66
[51] Int. Cl. ....................................... B62d 33/08
[50] Field of Search ............................................ 296/137
 (B), 23.7, 23.26; 52/66

[56] References Cited
 UNITED STATES PATENTS
 3,190,689 6/1965 Calthorpe .................... 296/137(B)

| | | | |
|---|---|---|---|
| 2,777,728 | 1/1957 | Barenti .......................... | 296/137(B) |
| 3,411,819 | 11/1968 | Tyree ............................ | 296/23 |
| 3,061,359 | 10/1962 | Pearlman ...................... | 294/64 |
| 3,146,081 | 8/1964 | Pearlman ...................... | 296/26 |
| 3,173,563 | 3/1965 | Finch ............................ | 214/519 |
| 3,212,812 | 10/1965 | Kurtz ............................. | 296/137 |

*Primary Examiner*—Philip Goodman
*Attorney*—Wheeler, Wheeler, House & Clemency

ABSTRACT: Disclosed herein is a farm wagon having a boxlike structure with a partially open end, together with a hinged roof which is selectively positionable between a lowered position and a raised position affording enlargement of the open end of the wagon and which materially transversely strengthens the sidewalls of the boxlike structure adjacent the upper ends and the open end.

PATENTED MAR 30 1971 3,572,811
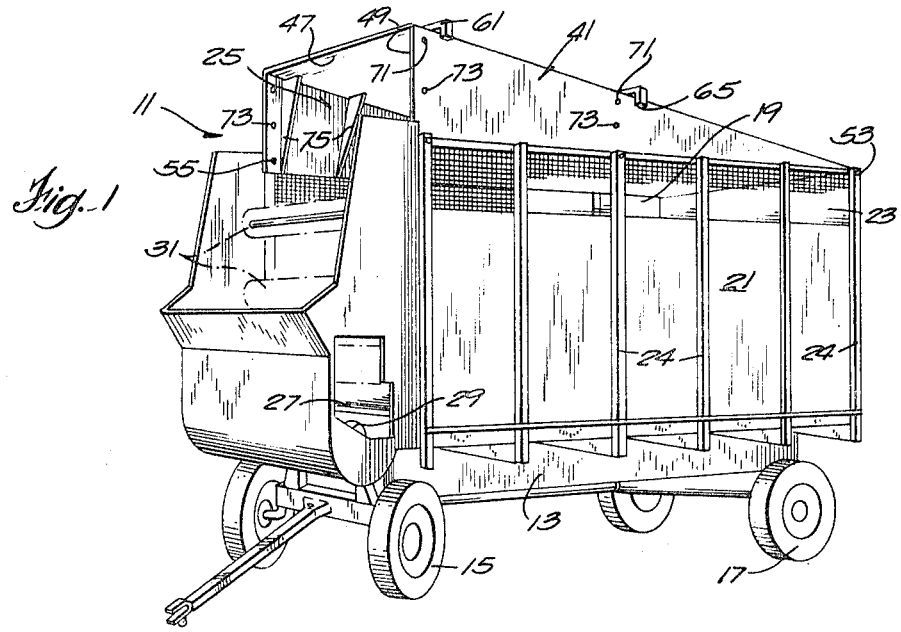
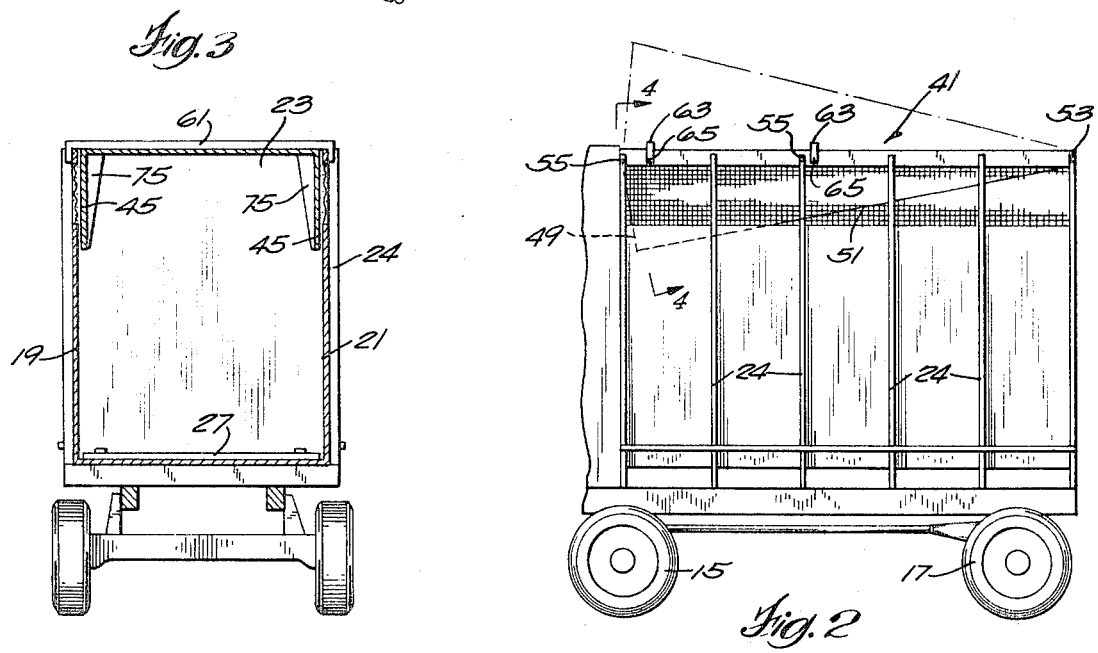
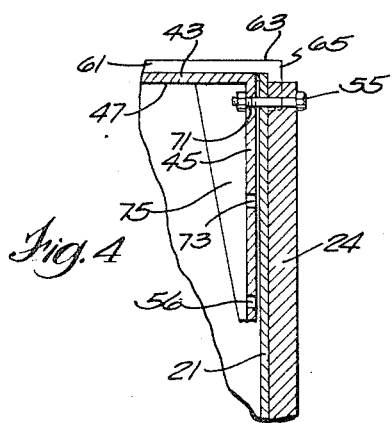
Inventor
John E. Kasten
By
Wheeler, Wheeler, House & Clemency
Attorneys

FARM WAGON WITH HINGED ROOF

BACKGROUND OF THE INVENTION

The invention disclosed herein represents a further development of the forage wagons disclosed in U.S. Pat. Nos. 3,047,174; 3,223,264; 3,275,176; and 3,276,554.

SUMMARY OF THE INVENTION

In accordance with the invention, a farm wagon having a boxlike structure with at least a partially open end is provided with a hinged roof which is selectively usable in a raised or elevated position and in a lowered or retracted position. The hinged roof serves to substantially limit loss of forage out of the top of the wagon during travel and at other times, and when the roof is in its elevated position, serves to afford enlargement of the open portion of the boxlike structure to facilitate loading. When the roof is in its retracted position, the wagon may be moved through doors and openings which have a relatively low clearance and through which the wagon could not travel with its roof in the elevated position. The roof further serves to structurally reinforce the sidewalls of the housing, particularly at the upper ends thereof and at the ends thereof adjacent to the end opening.

Specifically, the roof comprises a top panel which preferably has a smooth undersurface, and a pair of side panels extending respectively from the side edges of the roof panel in spaced parallel relation to each other. The roof is hinged to the walls of the boxlike structure for swinging movement about a horizontal axis and so that the side roof panels are in inwardly adjacent relation to the sidewalls. In addition, means are provided for releasably fixing the roof to the walls to maintain the roof in either of its elevated or retracted positions. Such means can also include one or more reinforcing members which are located on the upper surface of the roof and which serve as stop members engaging the upper edges of the sidewalls to limit downward travel of the roof and to establish the lowered position.

Other objects and advantages will become apparent from the accompanying drawings in which:

FIG. 1 is a perspective view of a farm wagon in accordance with the invention.

FIG. 2 is a fragmentary side elevational view of the farm wagon shown in FIG. 1.

FIG. 3 is a transverse cross section of the wagon shown in FIG. 1.

FIG. 4 is an enlarged fragmentary sectional view taken along line 4-4 of FIG. 2.

GENERAL DESCRIPTION

Shown in the drawings is a farm wagon which is generally designated 11 and which is specifically disclosed as a forage wagon. The wagon, as disclosed, conventionally includes a frame 13 which is supported by front and rear wheels 15 and 17 for travel over the ground. Extending in upstanding relation from the frame 13 (FIG. 3) are spaced sidewalls 19 and 21 and an end or rear wall 23 which is connected to the rearward edge of the sidewalls 19 and 21 to provide a boxlike structure which is, at least partially, open, as indicated at 25, at the other or frame end remote from the rear wall 23. The sidewalls can be reinforced by upstanding members 24.

The forage wagon 11 can also conventionally include a generally horizontal apron conveyor 27, such as disclosed in U.S. Pat. No. 3,223,264, which apron conveyor extends horizontally between the sidewalls 19 and 21. Located at the front of the apron conveyor 27 is a cross conveyor means in the form of a transverse auger 29 which is arranged to convey forage from the conveyor for lateral discharge at the end of the auger, also as generally shown in U.S. Pat. No. 3,275,176.

Arranged above the auger 29 can be several beaters 31. Various arrangements, such as disclosed, for instance, in my U.S. Pat. No. 3,275,176 can be employed for driving and controlling the beaters 31, the apron conveyor 27, and the auger 29. Notwithstanding the provisions of the auger 29 and the beaters 31, it will be noted that the front of the wagon 11 is still substantially open, particularly at the top at 25, and that the upper front portions and the upper edges of the sidewalls are, in large measure, transversely unsupported.

In accordance with the invention, the wagon 11 includes a roof or a cover structure 41, which is hinged at the rear about a horizontal axis to accommodate vertical roof-swinging movement between a lowered or retracted position and an upper or elevated or raised position increasing the open area 25 at the front of the forage wagon. The hinged roof 41 serves several functions including providing a cover for the forage in the wagon to prevent loss of such forage out of the top of the wagon during transit and otherwise, while, at the same time, offering an arrangement whereby the opening at the front of the wagon can be enlarged, as desired, to facilitate filling of the wagon. It is to be noted that such enlargement is provided while still permitting passage of the wagon through doors or openings having a relatively low overhead when the roof advantageously serves lowered position. In addition, the roof advantageously serves as a structural brace to increase the transverse strength or rigidity of the upper and forward portions of the sidewalls 19 and 21.

More particularly, the roof 41 includes (FIG. 4) a top panel 43 and two rigid side panels 45 which respectively rigidly extend from the side edges of the top panel 43. Preferably, the inner or undersurface 47 of the top panel 43 is smooth, so as to avoid catching or snaring of the forage thereon. Desirably, the side panels 45 are each generally of right-triangular shape with the hypotenuse edge being connected to the top panel 41 and (FIG. 2) with one of the side edges 49 extending principally up and down or vertically adjacent the forward end of the wagon and with the other of the right-angle edges 51 extending principally front to back or horizontally of the wagon or vehicle.

Means are provided for swingably mounting the roof 41 to the walls of the wagon so as to provide vertical swinging of the roof about a horizontal axis between its lowered and raised positions and for releasably fixing or maintaining the roof 41 in each of said positions. If desired, the arrangement can also be such so as to permit retention of the roof at one or more intermediate positions between the raised or lowered positions.

While various arrangements for accomplishing the foregoing functions can be employed, in the disclosed construction such means includes a pair of axially aligned bolts 53 respectively connecting the upper rear corner of the respective sidewalls 19 and 21 with the rearward portion of the roof 41. If desired, hinges between the top roof panel 43 and the rear wall 23 could be employed to provide for vertical swinging of the roof. In addition, bolts 55 extending through apertures 56 (see FIG. 4) are provided for releasably connecting the upper edges of the sidewalls 19 and 21 to the lower edges of the side roof panels 45 so as to releasably maintain the roof 41 in its raised or elevated position. Connection of the roof side panels 45 to the sidewalls 19 and 21 by the bolts 55, particularly at the front of the wagon 11, also materially reinforces the transverse strength and rigidity of the upper portion of the sidewalls 19 and 21.

Limitation of permissible downward swinging movement of the roof 41 from its elevated position to establish its lowered position and to prevent full collapse of the roof into the boxlike structure, while at the same time, transversely strengthening the upper roof panel 43, is provided by means in the form of one or more stop members. While various arrangements are possible, in the disclosed construction, such stop members are in the form of transverse roof-reinforcing members 61 which are secured to the upper or outer surface of the top panel 43 and which include outer ends 63 projecting sufficiently so as engage the upper edges of the sidewalls 19 and 21. It is to be noted that reinforcement of the roof top panel 43 by placement of the reinforcing crossmembers 61 on the upper surface of the roof leaves the inner surface 47 smooth to avoid the possibility of catching or snaring forage on the lower surface of the top roof panel.

While alternate constructions could be employed to limit downward swinging movement, the disclosed construction, as pointed out just above, also serves to materially transversely reinforce the top panel 43. In addition, if desired, the ends 63 of the crossmembers 61 can be provided with depending ears 65 spaced so as to overlie the outer surface of the top margin of the sidewalls 19 and 21, thereby to prevent spreading of the sidewalls 19 and 21 and materially increasing the transverse strength of the sidewalls, and particularly the upper front portions thereof.

Alternatively, if desired, the side roof panels 45 can be provided with additional apertures 71 for use with the bolts 55 to releasably securely fasten the sidewalls 19 and 21 to the roof side panels 45 to increase transverse sidewall strength when the roof is in its lowered position. Also, if desired, still other additional apertures 73 can be provided in the side roof panels 45 for use with the bolts 55 to provide one or more releasable intermediate positions between the fully raised and lowered roof positions.

Transverse strength of both the roof 41 and of the upper portions of the sidewalls 19 and 21 is further materially increased by providing the roof 41 with gusset or bracing members 75 which are generally of right-triangular configuration with each of the gusset members having one of the right-angle edges connected to one of the side roof panels 45 and having the other right angle edge connected to the top roof panel 43. Thus, the side panels are each rigidified and extend rigidly from the roof top panel.

Various of the features of the invention are set forth in the following claims.

I claim:

1. A wagon having a wheeled frame, spaced sidewalls extending upwardly from said frame, and end wall extending upwardly from said frame and connected to said sidewalls to provide a boxlike structure which is, at least partially, open at the end remote from said end wall, a roof comprising a top panel, and a pair of rigid side panels rigidly extending respectively from the side edges of said roof top panel and in spaced parallel relation to each other, means on said roof and on said walls for connecting said roof to said walls for roof-swinging movement about a horizontal axis relative to a position with said roof top panel in an inclined disposition so as to increase the open area at the end of said wagon remote from said end wall and with said side panels extending to said sidewalls, and means for releasably fixing said roof to said walls to maintain said roof tp panel in said position.

2. A farm wagon having a wheeled frame, spaced sidewalls extending upwardly from said frame, a rear wall extending upwardly from said frame and connected to the rear edges of said sidewalls to provide a boxlike structure which is, at least partially, open at the front, a roof comprising a top panel and spaced rigid side panels rigidly extending respectively from the side edges of said roof top panel and in spaced parallel relation to each other, means on said roof and on said walls for connecting said roof to said walls for swinging roof movement about a horizontal axis, stop members extending from said roof at a location adjacent to said roof top panel in position for engagement with said sidewalls to limit downward swinging movement of said roof, and means for releasably fixing said roof to said sidewalls to maintain said roof top panel in upwardly and forwardly inclined disposition so as to increase the open area at the front of said wagon.

3. A wagon in accordance with claim 2 wherein said side panels are generally of triangular shape and each have a first edge connected to said roof top panel and having a second edge extending principally vertically at the forward end of said wagon and a third edge extending principally horizontally.

4. A farm wagon having a wheeled frame, spaced sidewalls extending upwardly from said frame, a rear wall extending upwardly from said frame and connected to the rear edges of said sidewalls to provide a boxlike structure which is, at least partially, open at the front, a roof comprising a top panel and spaced side panels rigidly extending respectively from the side edges of said roof top panel and in spaced parallel relation to each other, said side panels being generally of right-triangular shape and each have a hypotenuse edge connected to said roof top panel and having one right-angle edge extending principally vertically at the forward end of said wagon and another right-angle edge extending principally horizontally, means on said roof and on said walls for connecting said roof to said walls for swinging roof movement about a horizontal axis with said side panels in inwardly adjacent relation to said sidewalls, stop members extending from said roof at a location adjacent to said roof top panel in position for engagement with said sidewalls to limit downward swinging movement of said roof, said stop member comprising reinforcing crossmembers secured to the upper surface of said roof top panel and having ends extending laterally beyond said sidewalls for engagement with the top edge of said sidewalls to limit downward swinging movement of said roof, and means for releasably fixing said roof to said sidewalls to maintain said roof top panel in upwardly and forwardly inclined disposition so as to increase the open area at the front of said wagon.

5. A wagon in accordance with claim 2 wherein the inside surface of said roof top panel is smooth.

6. A wagon in accordance with claim 2 including gusset members bracing said roof side panels with respect to said roof top panel.

7. A farm wagon having a wheeled frame, spaced sidewalls extending upwardly from said frame, a rear wall extending upwardly from said frame and connected to the rear edges of said sidewalls to provide a boxlike structure which is, at least partially, open at the front, a roof comprising a top panel and spaced side panels rigidly extending respectively from the side edges of said roof top panel and in spaced parallel relation to each other, gusset members bracing said roof side panels with respect to said roof top panel, said gusset members being of generally right-triangular shape and each have two edged disposed at right angles to each other, one of said edges being connected to one of said side panels and the other of said side edges being connected to said top panel, means on said roof and on said walls for connecting said roof to said walls for swinging roof movement about a horizontal axis with said side panels in inwardly adjacent relation to said sidewalls, stop members extending from said roof at a location adjacent to said roof top panel in position for engagement with said sidewalls to limit downward swinging movement of said roof, and means for releasably fixing said roof to said sidewalls to maintain said roof top panel in upwardly and forwardly inclined disposition so as to increase the open area at the front of said wagon.

8. A forage wagon having a wheeled frame, spaced sidewalls extending upwardly from said frame, a rear wall extending upwardly from said frame and connected to the rear edges of said sidewalls to provide a boxlike structure which is, at least partially, open at the front, an auger on said frame at the front of said wagon. An apron conveyor on said frame with one end adjacent to said auger, at least one beater extending transversely of said frame above said auger at the front of said wagon, a top roof panel having a generally smooth inside surface, side roof panels extending respectively from the side edges of said top roof panel and in spaced parallel relation to each other, said side roof panels being generally of right-triangular shape and each having a hypotenuse edge connected to said top roof panel and having one right-angle side edge extending principally vertically at the forward end of said wagon and another right-angle side edge extending principally horizontally, triangular members bracing said side roof panels with respect to said top roof panel and being of generally right triangular shape, each bracing member having two edges disposed at right angles to each other, one of said edges being connected to one of said side roof panels and the other of said side edges being connected to said top roof panel, means on said side roof panels and on said sidewalls for providing swinging movement of said top and side roof panels about a horizontal axis with said side roof panels in inwardly adjacent relation to said sidewalls, crossmembers secured to the upper surface of said top roof panel and having ends extending laterally beyond said sidewalls for engagement with the top edge of said sidewalls to limit downward swinging of said top and side roof panels relative to said walls, and means for releasably fixing said side roof panels to said sidewalls to maintain said top roof panel in upwardly and forwardly inclined disposition so as to increase the open area at the front of said wagon.

9. A wagon in accordance with claim 1 wherein said means for releasably fixing said roof to said sidewalls includes means releasably connecting said roof side panels and said sidewalls.

10. A wagon having a frame, spaced sidewalls extending upwardly from said frame, a rear wall extending upwardly from said frame and connected to the rear edges of said sidewalls to provide a boxlike structure which is, at least partially, open at the front, cross-conveying means on said frame at the front of said wagon, an apron conveyor on said frame with one end adjacent to said cross conveyor means, at least one beater extending transversely of said frame above said cross conveyor means at the front of said wagon, a top roof panel and spaced rigid side roof panels rigidly extending respectively from the side edges of said top roof panel and in spaced parallel relation to each other, means on said roof panels and on said walls for providing swinging movement of said top and side roof panels about a horizontal axis, means on said roof for engagement with said sidewalls to limit downward swinging of said top and side roof panels relative to said walls, and means for releasably fixing said side roof panels to said walls to maintain said top roof panel in upwardly and forwardly inclined disposition so as to increase the open area at the front of said wagon.

PO-1050
(5/69)

UNITED STATES PATENT OFFICE
CERTIFICATE OF CORRECTION

Patent No. 3,572,811            Dated March 30, 1971

Inventor(s) John E. Kasten

It is certified that error appears in the above-identified patent and that said Letters Patent are hereby corrected as shown below:

Column 2, lines 20 and 21    delete "advantageously serves"

should be --- is located in its --

Column 3, line 34           "and" should be --- an ---;

Column 3, line 47           "tp" should be --- top ---;

Column 4, line 35           "edged" should be --- edges ---;

Column 4, line 55           ". An" should be --- , an ---.

Signed and sealed this 7th day of December 1971.

(SEAL)
Attest:

EDWARD M. FLETCHER, JR.        ROBERT GOTTSCHALK
Attesting Officer               Acting Commissioner of Patents